United States Patent
Balakrishnan et al.

(10) Patent No.: US 11,748,674 B2
(45) Date of Patent: Sep. 5, 2023

(54) SYSTEM AND METHOD FOR HEALTH REPORTING IN A DATA CENTER

(71) Applicant: CORE SCIENTIFIC, INC., Bellevue, WA (US)

(72) Inventors: Ganesh Balakrishnan, Sammamish, WA (US); Carla Cortez, Playa Del Rey, CA (US); Aaron Strachan, San Francisco, CA (US)

(73) Assignee: Core Scientific Operating Company, Bellevue, WA (US)

( * ) Notice: Subject to any disclaimer, the term of this patent is extended or adjusted under 35 U.S.C. 154(b) by 512 days.

(21) Appl. No.: 16/707,964

(22) Filed: Dec. 9, 2019

(65) Prior Publication Data
US 2021/0027221 A1  Jan. 28, 2021

Related U.S. Application Data

(60) Provisional application No. 62/877,721, filed on Jul. 23, 2019.

(51) Int. Cl.
*G06Q 10/06* (2012.01)
*G06F 11/30* (2006.01)
(Continued)

(52) U.S. Cl.
CPC .... *G06Q 10/06311* (2013.01); *G06F 11/3006* (2013.01); *G06F 11/3055* (2013.01);
(Continued)

(58) Field of Classification Search
CPC ........... G06Q 10/06311; G06Q 20/065; G06Q 2220/00; G06F 11/3006; G06F 11/3055; G06F 11/3058; G06F 11/3495
See application file for complete search history.

(56) References Cited

U.S. PATENT DOCUMENTS

| 6,744,436 B1 | 6/2004 | Chirieleison, Jr. et al. |
| 7,652,889 B2 | 1/2010 | Larson et al. |

(Continued)

FOREIGN PATENT DOCUMENTS

| WO | WO-2017151161 A1 * | 9/2017 | |
| WO | 18182357 A1 | 10/2018 | |
| WO | WO-2019033116 A1 * | 2/2019 | ........... G06F 21/604 |

OTHER PUBLICATIONS

Wenli, Fan et al. "Multi-attribute node importance evaluation method based on Gini-coefficient in complex power grids." Iet Generation Transmission & Distribution 10: 2027-2034. (Year: 2016).*

(Continued)

*Primary Examiner* — John M Macilwinen
(74) *Attorney, Agent, or Firm* — Fishman Stewart PLLC

(57) ABSTRACT

A system and method for managing large numbers of computing devices such as cryptocurrency miners in a data center are disclosed. Status values from the computing devices are read and stored into a database, and a Gini coefficient is calculated on a subset of the stored status values. Coefficients beyond a predetermined threshold cause a support ticket to be generated if a support ticket has not already been generated and if the coefficients are not otherwise non-indicative of actual or likely computing device failures.

17 Claims, 7 Drawing Sheets

(51) Int. Cl.
  *G06F 11/34* (2006.01)
  *G06Q 20/06* (2012.01)
  *G06Q 10/0631* (2023.01)

(52) U.S. Cl.
  CPC ....... *G06F 11/3495* (2013.01); *G06Q 20/065* (2013.01); *G06Q 2220/00* (2013.01)

(56) References Cited

U.S. PATENT DOCUMENTS

| | | | |
|---|---|---|---|
| 10,503,942 | B1 | 12/2019 | Thurston et al. |
| 10,630,566 | B1* | 4/2020 | Nguyen .............. H04L 43/0817 |
| 11,137,161 | B2 | 10/2021 | Ock et al. |
| 2004/0160897 | A1 | 8/2004 | Fowler et al. |
| 2005/0114502 | A1* | 5/2005 | Raden .................. G06F 11/328 709/224 |
| 2006/0020807 | A1 | 1/2006 | Aura et al. |
| 2007/0101173 | A1 | 5/2007 | Fung |
| 2009/0045967 | A1 | 2/2009 | Bandholz et al. |
| 2009/0144568 | A1 | 6/2009 | Fung |
| 2010/0287093 | A1* | 11/2010 | He ....................... G06Q 40/025 705/38 |
| 2011/0057803 | A1 | 3/2011 | Yamaoka et al. |
| 2013/0211870 | A1* | 8/2013 | Lawson .............. H04L 67/2804 705/7.25 |
| 2014/0149493 | A1 | 5/2014 | Acer et al. |
| 2014/0222745 | A1 | 8/2014 | Deng et al. |
| 2014/0281644 | A1 | 9/2014 | Rallo et al. |
| 2015/0170112 | A1 | 6/2015 | DeCastro |
| 2015/0215032 | A1 | 7/2015 | Bevilacqua et al. |
| 2015/0261269 | A1 | 9/2015 | Bruscoe |
| 2015/0324712 | A1 | 11/2015 | Agarwal et al. |
| 2016/0142884 | A1* | 5/2016 | Sears ........................ G01S 5/02 455/404.2 |
| 2016/0170468 | A1 | 6/2016 | Bhandaru et al. |
| 2016/0337210 | A1* | 11/2016 | Koplin ........... G06Q 10/063114 |
| 2017/0103458 | A1* | 4/2017 | Pierce .................... G06Q 40/04 |
| 2017/0187575 | A1* | 6/2017 | Waugh ............... H04L 41/0843 |
| 2017/0192928 | A1 | 7/2017 | Arnouse |
| 2018/0284737 | A1 | 10/2018 | Cella et al. |
| 2019/0303791 | A1* | 10/2019 | Yoshikawa ............. G06F 30/00 |
| 2019/0370793 | A1* | 12/2019 | Zhu ........................ G06Q 20/06 |
| 2020/0013027 | A1* | 1/2020 | Zhu .................... G06Q 20/0658 |
| 2020/0042416 | A1* | 2/2020 | Satoyama ............... G06F 3/067 |
| 2020/0258013 | A1* | 8/2020 | Monnett ................ G06Q 10/06 |
| 2021/0028983 | A1 | 1/2021 | Balakrishnan |
| 2021/0092875 | A1 | 3/2021 | Hellmann-Regen |
| 2021/0135959 | A1* | 5/2021 | Ricks .................. H04L 41/0806 |

OTHER PUBLICATIONS

Aleksandr et al., English translation of RU-2681336-C1, "System for Monitoring Operating Parameters and Operation Conditions of a Farm for the Mining of Cryptotokens", pp. 1-5. Published Mar. 6, 2019. (Year: 2019).*

"A Mining System and its Operational Method". English translation of KR-20190108452-A. Published Sep. 24, 2019. (Year: 2019).*

Dotemoto, Philip. "FPGA Based Bitcoin Mining." (Year: 2014).*

Yang and Zhao. English translation of CN-208985656-A, "Pipeline Inspection Monitoring Method and Device". pp. 1-10. Published Dec. 11, 2018. (Year: 2018).*

Kraft, Daniel. "Difficulty control for blockchain-based consensus systems." Peer-to-Peer Networking and Applications 9: 397-413. (Year: 2016).*

Romiti, Matteo, et al. "A deep dive into bitcoin mining pools: An empirical analysis of mining shares." arXiv preprint arXiv: 1905.05999. (Year: 2019).*

Jung, Eunjin, et al. "Data mining-based ethereum fraud detection." 2019 IEEE International Conference on Blockchain (Blockchain). IEEE. (Year: 2019).*

Kwon, Yujin, et al. "Impossibility of full decentralization in permissionless blockchains." Proceedings of the 1st ACM Conference on Advances in Financial Technologies. (Year: 2019).*

Kim, Seoung Kyun, et al. "Measuring ethereum network peers." Proceedings of the Internet Measurement Conference 2018. (Year: 2018).*

International Search Report and Written Opinion dated Nov. 6, 2020 related to corresponding application PCT/US2020/043088.

Taylor. "The Evolution of Bitcoin Hardware," IEEE Computer SOCiety Sep. 2017, [retrieved on Sep. 20, 2020]. Retrieved from the Internet: <URL:https:llcseweb.ucsd.edu/-mbtaylor/papersITaylor_Bitcoin_IEEE_Computer_2017.pdf> pp. 1-9.

Managed Templates—Switch Managed Miner setting quickly, https://support.awesomeminer.com/support/solutions/articles/35000086012-managed-templates-switch-managed-miner-settings-quickly, accessed Jan. 27, 2021.

Bitcoin Forum, Awesome Miner, https://bitcointalk.org/index.php?topic=676942.0, accessed Jan. 27, 2021.

Transcript with selected screenshots of "Firmware for ASIC S9. 20 Th/s." video posted to Youtube on Apr. 16, 2019; <https://www.youtube.com/watch?v=Sp_vg5_3IU4>; accessed Mar. 29, 2021.

Transcript with selected screenshots of "VNISH Smart Mine Antminer S9 Firmware Special Edition, Virus Blocking. Fee 1.7%-1.8%" video posted to Youtube May 21, 2019; <https://www.youtube.com/watch?v=Py9e7n73rtl>; accessed Mar. 29, 2021.

Canadian Office Action dated Mar. 16, 2022 for Canadian Patent Application No. 3,147,648.

* cited by examiner

FIG. 6

| Thresholds per metric | Overall | Site | Pod | Rack | Switch | Machine |
|---|---|---|---|---|---|---|
| Machines Up/Down | >1% machines down | >2% machines down | >5% machines down | >10% machines down | >10% machines down | 100% machine down |
| Hash Rate | 2% drop vs trailing 3 hours average | 2% drop vs trailing 3 hours average | 5% drop vs trailing 3 hours average | 10% drop vs trailing 3 hours average | 10% drop vs trailing 3 hours average | 10% drop vs trailing 3 hours average |
| Temperature | +- 10 degrees vs trailing 1 hour average | +- 10 degrees vs trailing 1 hour average | +- 15 degrees vs trailing 1 hour average | +- 20 degrees vs trailing 1 hour average | +- 20 degrees vs trailing 1 hour average | +- 20 degrees vs trailing 1 hour average |
| Fan Speed | >1% of fans are down | >1% of fans are down | >2% of fans are down | >5% of fans are down | >5% of fans are down | |

SYSTEM AND METHOD FOR HEALTH REPORTING IN A DATA CENTER

CROSS-REFERENCE TO RELATED APPLICATIONS

This application claims priority to U.S. Provisional Patent Application Ser. No. 62/877,721, filed on Jul. 23, 2019, and titled "COMPUTING SYSTEM", the contents of which are hereby incorporated by reference in their entirety.

TECHNICAL FIELD

The present disclosure generally relates to the field of computing and, more particularly, to systems and methods for managing a plurality of computing devices such as miners in a data center.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Many cryptocurrencies (e.g., Bitcoin, Litecoin) are based on a technology called blockchain, in which transactions are combined into blocks. These blocks are stored with previous blocks of earlier transactions into a ledger (the "blockchain") and rendered immutable (i.e., practically unmodifiable) by including a hash. The hash is a number that is calculated based on the blocks and that meets the particular blockchain's criteria. Once the block and hash are confirmed by the cryptocurrency network, they are added to the blockchain. The hashes can be used to verify whether any of the prior transactions or blocks on the blockchain have been changed or tampered with. This creates an immutable ledger of transactions and allows the cryptocurrency network to guard against someone trying to double spend a digital coin.

Many cryptocurrency networks consist of a large number of participants that repeatedly attempt to be the first to calculate a hash meeting the blockchain network's requirements. Depending on the blockchain, they may receive a reward (e.g., a coin reward or transaction fee reward) for being first to calculate a successful hash, and that reward may motivate them to continue participating (mining).

Many blockchain networks require computationally difficult problems to be solved as part of the hash calculation. The difficult problem requires a solution that is a piece of data which is difficult (costly, time-consuming) to produce, but is easy for others to verify and which satisfies certain requirements. This is often called "proof of work". A proof of work (PoW) system (or protocol, or function) is a consensus mechanism. It deters denial of service attacks and other service abuses such as spam on a network by requiring some work from the service requester, usually meaning processing time by a computer. The difficulty level may change periodically for some blockchain networks that attempt to compensate for increases in hash power that occur on the network.

Participants in the network operate standard PCs, servers, or specialized computing devices called mining rigs or miners. Because of the difficulty involved and the amount of computation required, the miners are typically configured with specialized components that improve the speed at which hashes (the device's hash rate) or other calculations required for the blockchain network are performed. Examples of specialized components include application specific integrated circuits (ASICs), field programmable gate arrays (FPGA), graphics processing units (GPUs) and accelerated processing unit (APUs).

Miners are often run for long periods of time at high frequencies that generate large amounts of heat. Even with cooling (e.g., high speed fans), the heat and constant operation can negatively impact the reliability and longevity of the components in the miners. ASIC miners for example have large numbers of hashing chips (e.g., 100's) that are more likely to fail as temperatures rise.

Many participants in blockchain networks operate large numbers (e.g., 1000's, 10,000's, 50,000's, or more) of different miners (e.g., different generations of miners from one manufacturer or different manufacturers) concurrently in large data centers. These data centers and large numbers of miners can be difficult to manage. Data centers housing large numbers of miners or other ASIC- or GPU-based systems have different challenges than traditional data centers housing more general computers. This is due to the significantly higher density, including higher power usage, higher heat generation, and near constant compute-intensive operation.

The constant operation at high temperatures often leads to component failures (e.g., broken fan or burnt-out chip). These failures require service personnel to physically locate the particular devices with the failed components (amongst thousands of devices) in order to service the device and replace the failed components. In very large data centers, there can be significant numbers of units failing each day, both for known and unknown reasons.

A typical data center management solution is to determine whether or not a computing device is responding to requests and then to present that in a table (e.g., responding systems are green and non-responding systems are red). The failed devices identified in the tables are then repaired or replaced by technicians. The table of failed devices often does not provide useful insight to data center technicians about potential underlying causes for the computing device failures or the ability to predict likely future failures. As the number of failed devices increases, the time required to repair them can be significant, and a table of failed devices may not provide sufficient information to determine how to prioritize repairs and whether the number of failed devices for a particular area of the data center is unexpected.

For at least these reasons, there is a desire for a system and method to allow for improved management of large numbers of computing devices such as miners in a data center.

SUMMARY

For at least the reasons set forth above, an improved method and system for managing a data center with a plurality of computing devices in a data center is contemplated. In one embodiment, the system comprises a first computing device (e.g., management server) that may be configured to monitor and/or control, at least in part, operation of a plurality of second computing devices. The second computing devices may, for example and without limitation, include cryptocurrency mining computing devices (e.g., miners) and/or computing devices suited for artificial intelligence processing (e.g., systems with large numbers of GPUs).

It may be desirable to predict, detect, and/or fix malfunctions of the second computing devices in an efficient manner. With examples, a first computing device monitoring second computing devices may, for example and without limitation, determine if a second computing device is not functioning, if one or more parameters associated with a second computing device are outside one or more thresholds, and/or if one or more parameters are fluctuating significantly relative to an average (e.g., a 1-hour moving average). The one or more parameters may include, for example and without limitation, hash rate, fan speed, chip frequency, chip voltage, and/or temperature, among others. The first computing device may be configured to obtain parameters associated with second computing devices periodically, such as, for example, about every six minutes.

In examples, a first computing device may be configured to evaluate one or more parameters associated with a second computing device over a period of time. Additionally or alternatively, a first computing device may be configured to compare one or more parameters across a group of second computing devices and/or relative to another group of second computing devices. With examples, a first computing device may be configured to determine stability values for second computing devices. Stability of a second computing device may correspond to the number of fluctuations and/or the severity of fluctuations of one or more parameters associated with the second computing devices. Higher numbers or severity of fluctuations may correspond to lower stability (and vice versa), which may suggest that one or more second computing devices are functioning abnormally and additional action should be taken.

In some embodiments, a first computing device may evaluate the stability of a second computing device by determining a Gini coefficient. A Gini coefficient may be a single value that may be used to represent an amount of inequality/instability across a plurality of values (e.g., time-series values).

Status may be periodically collected from each of the (second) computing device. The computing devices may include miners such as ASIC miners, FPGA miners, and GPU miners. Unlike prior solutions, this status data is used to generate a Gini coefficient that is then used to determine when to generate support tickets. Beneficially, support tickets may be intelligently and proactively generated based on Gini coefficients for single devices (e.g., based on status data samples for that device over time) or on groups of computing devices (e.g., the computing devices in a single rack or connected to a single switch). In one embodiment, the last N most recent status values are used. For example, support tickets may be generated when the Gini coefficient indicates a problem with a subset of the devices in the data center, e.g., there is a hash rate inequality beyond a specified threshold for the devices in a particular rack. The hash rate may, for example, be calculated based on the last N most recent status values (e.g., hash rate, temperature, fan speed, chip frequency, chip voltage, number of machines not responding). In some embodiments, status data from sensors external to the computing devices may also be included in the calculation, e.g., data center temperature and humidity sensors.

In some embodiments, a ticket may not be generated if the corresponding computing device or devices already have a ticket generated for them (e.g., a prior ticket based on device failure). A ticket may also not be generated if special circumstances indicate that a coefficient beyond the threshold is not indicative of an actual or likely device problem. Examples of these special circumstances include a recent power cycle or change in difficulty of the hashing algorithm that the computing device is working on. This beneficially prevents data center technicians from being overwhelmed with multiple and or unneeded tickets.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 6 is a table illustrating one example of thresholds for the method of FIG. 5.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Figure 1:
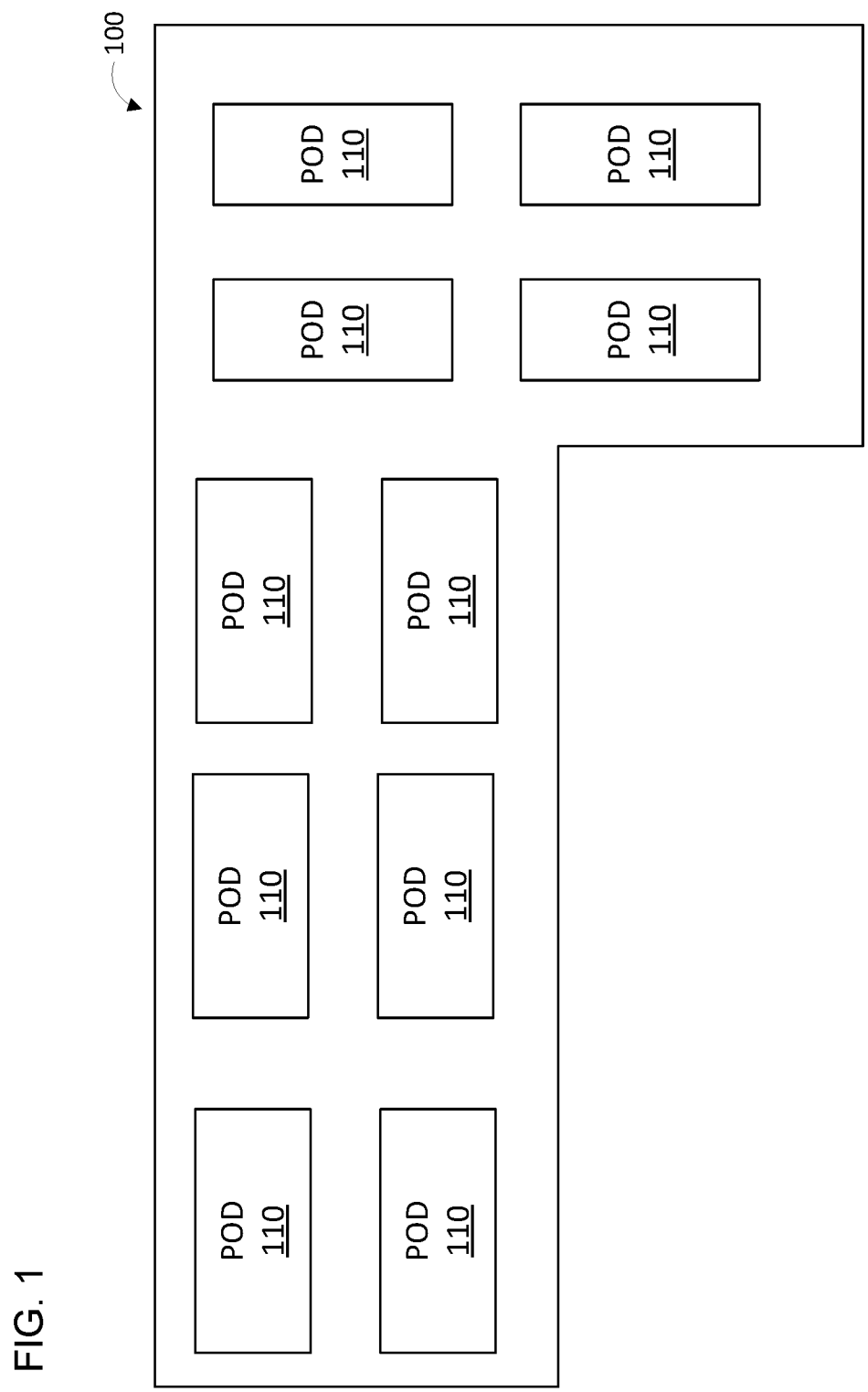
FIG. 1 is a top-down view of one example of a data center for computing devices.

Referring now to FIG. 1, a top-down view of one example of a data center 100 for computing devices is shown. The data center 100 is configured with a large number of pods 110. Pods are standardized blocks of racks, either in a row or (more typically) a pair of rows, that share some common infrastructure elements like power distribution units, network routers/switches, containment systems, and air handlers. For example, a pod may have two parallel racks of devices, spaced apart and each facing outwards. The devices on the racks may all be oriented to pull cool air in from outside the pod and discharge the hot air (heated by the computing devices) into the empty space in the center of the pod where the hot air then rises up and out of the data center. For example, there may be hot air ducts positioned above the middle of each pod to capture the hot waste air and then discharge it out of the data center via vents in the roof of the data center.

Figure 2:
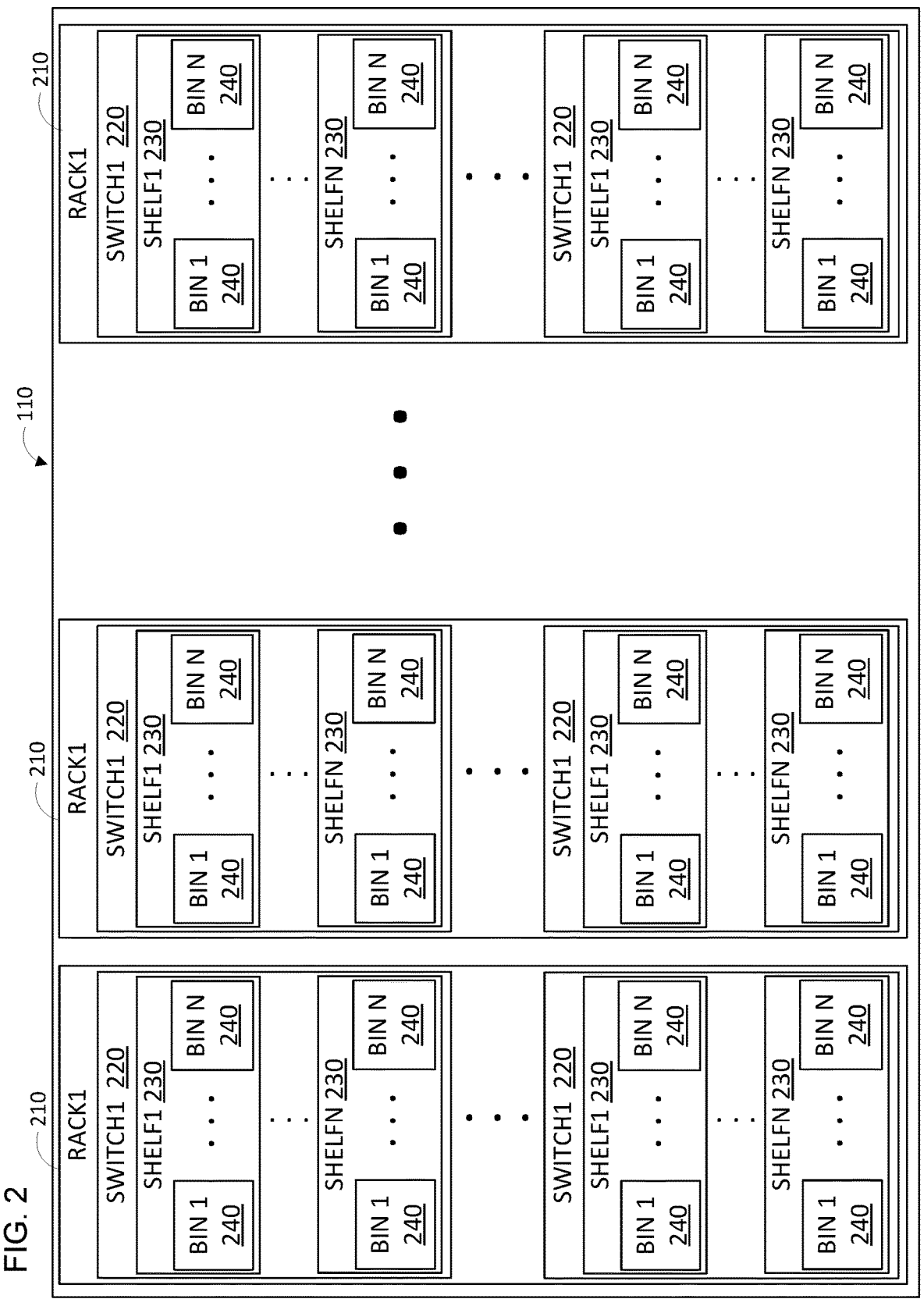
FIG. 2 is a front view of one example of a pod in a data center for computing devices.

Turning now to FIG. 2, the front side of one example of a pod 110 is shown. The pod 110 has a number of racks 210 that each have a number of shelves 230 for holding computing devices. For organization and management purposes, the shelves may be grouped together in switch sections 220 that are each supported by the same network switch. In each of the shelves 230 there may be multiple bin locations 240 that each hold a single computing device. Each computing device may be installed in a bin with connections for power and a network connection.

Figure 3:
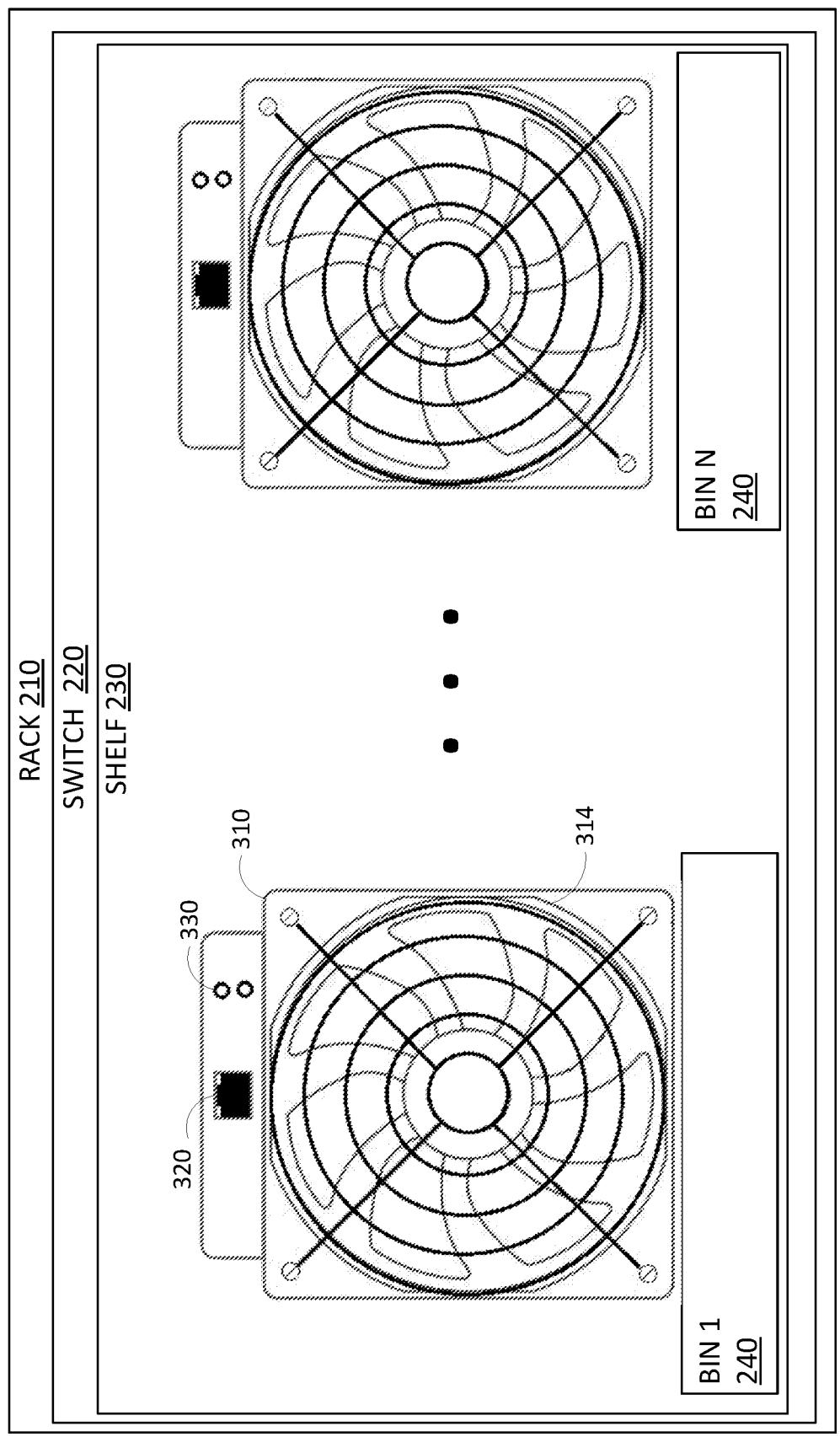
FIG. 3 is an illustration of one example of a portion of a rack for computing devices in a data center.

Turning now to FIG. 3, a more detailed frontal view of one shelf 230 in an example rack 210 is shown. In this example, a computing device 310 is installed in each bin 240 in the shelf 230. In this example, computing device 310 is an ASIC miner. ASIC miners typically include a controller board with a network port 320, one or more status indicator LEDs 330 and a pair of cooling fans (front fan 314 shown) that draw air through the center of the miner where there are multiple hash boards performing calculations and generating heat.

As noted above, one issue facing operators of large data centers is identifying and servicing computing devices with errors. When a device is malfunctioning, one option is to connect to the device's control interface (e.g., via network connection 320) and turn on or flash the device's status indicator LEDs 330. This allows the data center service technician to more easily find the malfunctioning device amongst the hundreds or thousands of devices operating in the data center.

Figure 4:
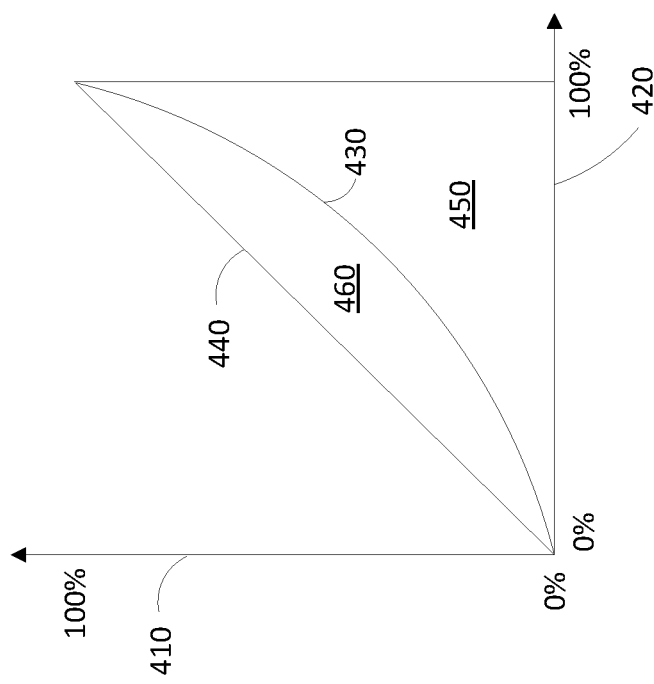
FIG. 4 is an illustration of one example of a Lorenz curve usable to determine a Gini coefficient for managing computing devices in a data center.

Turning now to FIG. 4, a graph illustrating an example Lorenz curve usable to calculate a Gini coefficient for managing computing devices is shown. The vertical axis 410 represents the cumulative percentage of the sum of the last N samples. The horizontal axis 420 represents the cumulative percentage of the last N samples. The curve 430 represents the Lorenz curve, which can be used to determine a measure of equality in a system. The Gini coefficient, also called the Gini index, is a ratio of the area 460 (above the Lorenz curve) to the area below the line 440 (area 460 plus area 450). The Gini coefficient corresponds to the area above the Lorenz curve 430 relative to the total area under 45-degree line 440 (which may represent complete equality/stability).

The Gini index or coefficient is used in economics as a measure for comparing income inequality in countries, where a Gini index of 1 represents perfect income inequality (i.e., one person having all the income), and a Gini index of 0 represents perfect income equality (all people have an equal income). To graph income inequality, the horizontal axis 420 represents the fraction or percentage of people, and the vertical axis 410 represents the fraction or percentage of total income.

One method for calculating the Gini index or coefficient is shown in Eq. 1, where the samples $x'_i$ are ordered ascendingly and where n is the number of samples, and the mean size of the samples is μ:

$$G = \frac{\sum_{i=1}^{n}(2i-n-1)x'_i}{n^2\mu}.$$  Eq. 1

Other methods for calculating the Gini coefficient are also possible and contemplated. Another method for calculating the Gini index or coefficient is shown in Eq. 2, where the data is unordered, and the mean of the difference between every possible pair of individual samples is divided by the mean size of the samples μ, and where n is the number of samples:

$$G = \frac{\sum_{i=1}^{n}\sum_{j=1}^{n}|x_i - x_j|}{2n^2\mu}.$$  Eq. 2

Unlike prior solutions for managing large numbers of computing devices in a data center, the Gini coefficient may be beneficially used to determine when to automatically generate support tickets. In one embodiment, status data received from the computing devices is used to calculate a Gini coefficient. For example, the horizontal axis 420 may represent the fraction or percentage of devices or samples rather than people, and the vertical axis 410 may represent the fraction or percentage of a total device status data (e.g., percentage of total hash rate, temperature or change in temperature, fan speed or change in fan speed, number of machines up/down or change in the number of machines up/down). This may be for a subset of the computing devices in the data center, e.g., devices in a rack, or a single computing device (e.g., status samples over time).

Figure 5:
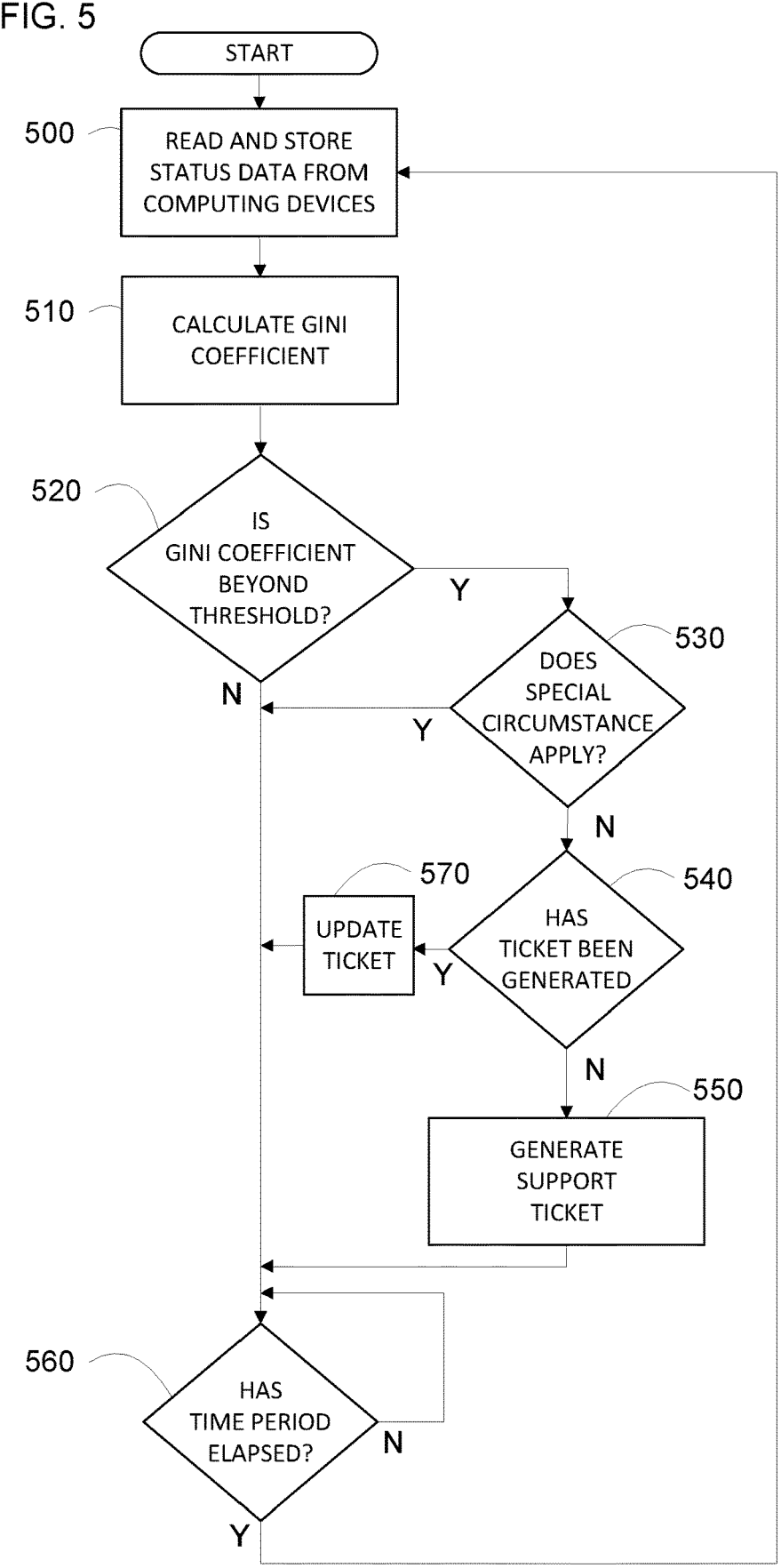
FIG. 5 is a flowchart illustrating an example method for managing a data center in accordance with the present disclosure.

Turning now to FIG. 5, a flow chart is shown illustrating an example embodiment of a method for managing computing devices in a data center according to the teachings of the present disclosure. A management application or device may perform this method to monitor threshold metrics based on aggregation levels of inequality based on the Gini coefficient. Status data is read and stored from the computing devices (step 500). This status data may include for example, device up/down status, device temperature, device hash rate, device power usage, fan speed (there may be multiple fans on the device, each reporting a different fan speed), the number of failed devices (e.g., per switch, per rack, per pod). Hash rate and fan speed metrics may, for example, be measured by percentage of variance, while temperature may be measured by absolute degree thresholds. The device up/down metric may be compared against total absolute number of machines/second computing devices. The data may be stored, e.g., to a database.

A Gini coefficient may be calculated based on the stored status data (step 510). For example, in one embodiment the hash rate samples and temperature samples (each taken every 6 minutes) for a device for the last 24 hours may be used to determine two Gini coefficients for that device. In another embodiment, the same two Gini coefficients are calculated, but for multiple computing devices in aggregate (e.g., for all the devices in a single shelf, rack or pod). If the calculated coefficient is within a predetermined threshold (step 520), no ticket is created and the date is stored after a predetermined time period (step 560), e.g. 5, 6 or 10 minutes.

If the calculated coefficient is beyond the predetermined threshold, an evaluation may be made to determine if any special circumstances apply (step 530). For example, if the device or devices providing the status data recently rebooted, their hash rate may require some time to stabilize before they may be indicative of the computing device's performance. In another example, if the difficulty for the particular cryptocurrency blockchain that the computing device or devices are mining has just increased, the hash rate for the device will drop, but the drop will not be a good indicator of a device problem or impending failure.

If no special circumstances apply, a check is made see if a ticket has already been made for the computing device or devices (step 540). If a ticket has already been made, a second one is beneficially not generated. Multiple tickets for the same device failure can confuse and in large volumes overwhelm data center technicians. In some embodiments, the previously generated ticket may be updated (step 570) instead. If a ticket has not already been made, a support ticket is generated (step 550). In some embodiments, the ticket may be created by writing an entry in a database, by calling a ticket management application's API, by dispatching a message to a predefined support queue, or by sending email to a support email account inbox. The support ticket may for example include information regarding which device or devices are involved, which status has the out of threshold Gini coefficient, and the value of the coefficient.

Turning now to FIG. 6, a table is presented that illustrates one example of acceptable or expected thresholds or ranges (e.g., in connection with step 520 in FIG. 5) for different computing device status data, including machine failures (up/down status), hash rates, temperatures, and fan speeds for selected subsets of computing devices in a data center. In some embodiments, a user interface is provided to the user to enable to edit these thresholds or ranges, such as by a user with appropriate (e.g., administrator level) permissions.

Figure 7:
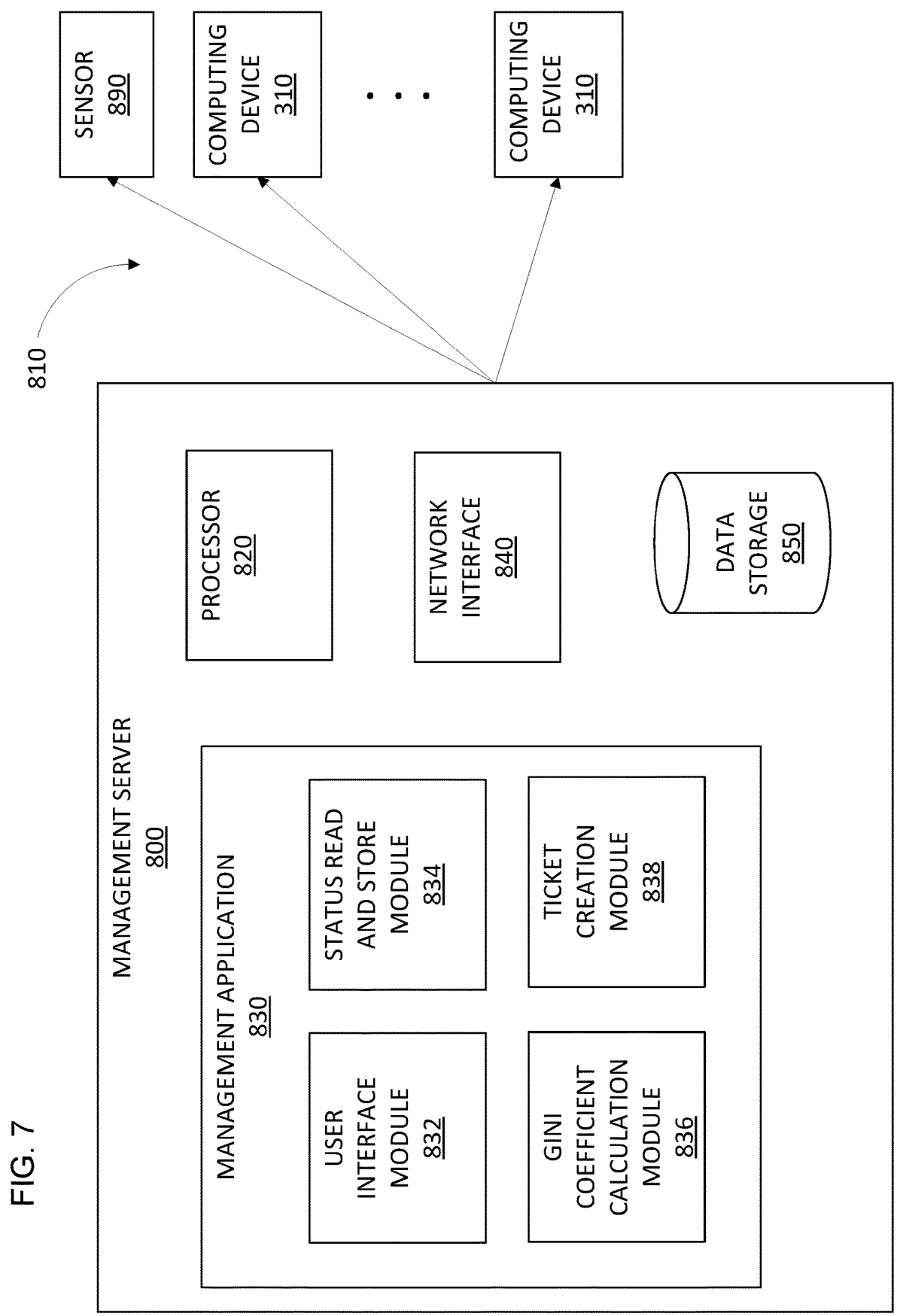
FIG. 7 is a diagram of one example of a system for managing a data center in accordance with the present specification.

Turning now to FIG. 7, an illustration of an example embodiment of a system for managing computing devices in a data center is shown. In this embodiment the system comprises a large number of computing devices 310 (e.g., miners). The computing devices 310 communicate over a network 810 with a management server 800 via the server's network interface 840. While wireless networks are possible (and may be preferred for communication with peripherals such as data center temperature sensor 890), current computing device density in data centers means wired networks such as ethernet are currently preferred for communications between management server 800 and computing devices 310. Management server 800 may be a traditional PC or server, or a specialized appliance. Management server 800 may be configured with one or more processors 820, volatile memory and non-volatile memory such as flash storage or internal or external hard disk (e.g., network attached storage accessible to server 800). Server 800 is configured to execute management application 830 to assist users (e.g., data center technicians) with managing computing devices 310.

Management application 830 is preferably implemented in software (e.g., instructions stored on a non-volatile storage medium such as a hard disk, flash drive, or DVD-ROM), but hardware implementations are possible. Management application 830 may include a number of modules, including for example, a user interface module 832 configured to receive input from a user and display data to the user, and a computing device status read and store module 834 configured receive status data from computing devices 310 and store them into data storage 850. Data storage 850 is preferably a database, either locally installed on management server 800 or remote and accessible via network interface 840 and network 810. Management application 830 may also include a Gini coefficient calculation module 836 configured to calculate Gini coefficients based on the date in data storage 850, and ticket creation module 838 that is configured to determine whether to create a ticket based on the calculated Gini coefficient. As noted above, this determination may involve checking to see if a ticket has already been generated and whether a special circumstance applies, such as a recent change in the environment, a change in hash difficulty, a recent computing device reboot, or a newly installed device without sufficient history to generate a proper Gini coefficient.

In another embodiment, a first computing device (e.g., management server 800) may be configured to determine the Gini coefficient for all or some of the second computing devices 310. The first computing device may utilize the Gini coefficient to determine if one or group of second computing devices 310 is not sufficiently stable, such as if the Gini coefficient is outside a predetermined threshold. If the first computing device determines that one or a group of second computing devices 310 is not sufficiently stable (e.g., if the second computing devices 310 are fluctuating, but not necessarily malfunctioning), the first computing device may determine that additional action (e.g., generating a support ticket) should be taken to investigate the identified one or group of second computing devices 310.

In some embodiments, the first computing device may determine a separate Gini coefficient for each of a plurality of parameters associated with the second computing devices. For example and without limitation, the first computing device may determine a Gini coefficient for the percentage of operating time (relative to malfunctioning time), hash rate, fan speed, and/or chip temperature, among others. The first computing device may compare current values of parameters to moving averages of those parameters.

In some embodiments, the first computing device may be configured to ignore some Gini coefficients outside of threshold ranges for second computing devices in certain circumstances. For example and without limitation, if the hash rate of one or a group of second computing devices has a low Gini coefficient because the hash rate has been increasing (which may be positive/beneficial), the first computing device may not determine that additional action should be taken for that one or group of second computing devices. The first computing device may continue to monitor such second computing devices.

In some embodiments, the first computing device may be configured to create a single support ticket for a second computing device (or group of second computing devices). For example, if the first computing device has already created a support ticket for a second computing device, the first computing device may update the existing support ticket with any additional issues and may not generate a new/separate support ticket for the additional issues. Additionally or alternatively, the first computing device may be configured to prioritize certain support tickets, such as support tickets for second computing devices that are not functioning at all over support tickets for unstable functioning second computing devices.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method for managing a data center having a plurality of computing devices, the method comprising:
   periodically reading and storing one or more status values for each of the plurality of computing devices;
   determining if at least a subset of the computing devices are not sufficiently stable by calculating a Gini coefficient using at least a subset of the stored status values; and
   generating a support ticket if the Gini coefficient exceeds a predetermined threshold and a support ticket has not already been generated for the computing devices corresponding to the Gini coefficient;
   wherein the support ticket is not generated if the status values are hash rates, and a change in hash difficulty has recently occurred.

2. The method of claim 1, wherein the status values are hash rates, wherein the predetermined threshold is a 10% drop, and wherein the subset of the stored status values are a set of 3 hours-worth of samples for a particular subset of the plurality of computing devices.

3. The method of claim 1, wherein the plurality of computing devices comprise ASIC miners, FPGA miners, and GPU miners.

4. The method of claim 1, wherein the subset of values comprises the N most recent status values for a particular one of the plurality of computing devices.

5. The method of claim 1, wherein the subset of values comprises the most recent status values for the computing devices in a particular area of the data center.

6. The method of claim 1, further comprising updating a previously generated support ticket with one or more additional issues.

7. The method of claim 1, wherein the subset of stored status values includes a number of failed devices.

8. The method of claim 1, further comprising prioritizing the ticket lower if the computing devices corresponding to the Gini coefficient are unstable but still functioning.

9. A non-transitory, computer-readable storage medium storing instructions executable by a processor of a computational device, which when executed cause the computational device to conduct the method of claim 1.

10. The non-transitory, computer-readable storage medium of claim 9, wherein managing the plurality of computing devices in the data center further comprises not generating the support ticket if an earlier support ticket has already been generated and adding information to the earlier support ticket.

11. The method of claim 1, wherein periodically reading and storing one or more status values for each of the plurality of computing devices includes reading and storing a plurality of status values for a plurality of parameters for each of the plurality of computing devices; and
   calculating the Gini coefficient using at least the subset of the stored status values includes determining a respective Gini coefficient for each parameter of the plurality of parameters associated with a particular computing device of the plurality of computing devices.

12. The method of claim 11, wherein the plurality of parameters include hash rate, temperature, and percentage of operating time.

13. The method of claim 1, wherein the one or more stored status values include values for percentage of operating time, hash rate, fan speed, and chip temperature for each of the plurality of computing devices.

14. A system for managing a plurality of computing devices in a data center, the system comprising:
- a management server configured to communicate with the plurality of computing devices via a network, wherein the management server is configured to:
- periodically read and store status data from the plurality of computing devices;
- determine if at least a subset of the plurality of computing devices are sufficiently stable by calculating a Gini coefficient for at least a subset of the stored status data; and
- create a support ticket in response to detecting that the calculated Gini coefficient is outside a predetermined threshold and that no prior ticket has already been generated for the computing devices corresponding to the calculated Gini coefficient;
- wherein the management server is configured to determine if at least one exception of a plurality of exceptions applies if the Gini coefficient is outside the predetermined threshold;
- the management server is configured not to create the support ticket if at least one exception applies; and
- the plurality of exceptions includes (i) if a corresponding computing device of the plurality of computing devices was recently rebooted, (ii) if a hash difficulty recently changed, and (iii) if a change associated with the Gini coefficient that is outside the predetermined threshold is a beneficial change.

15. The system of claim 14, wherein the support ticket includes the Gini coefficient.

16. A system for managing a plurality of computing devices in a data center, the system comprising:
- a management server configured to communicate with the plurality of computing devices via a network, wherein the management server is configured to:
- periodically read and store status data from the plurality of computing devices;
- determine if at least a subset of the plurality of computing devices are sufficiently stable by calculating a Gini coefficient for at least a subset of the stored status data; and
- create a support ticket in response to detecting that the calculated Gini coefficient is outside a predetermined threshold and that no prior ticket has already been generated for the computing devices corresponding to the calculated Gini coefficient;
- wherein the management server is configured to refrain from generating a ticket if the status data includes hash rates, and a change in hash difficulty has recently occurred.

17. The system of claim 14, wherein the management server is configured to present a user interface to allow a user to edit the predetermined threshold.

* * * * *